US011511981B2

(12) United States Patent
Marshall et al.

(10) Patent No.: US 11,511,981 B2
(45) Date of Patent: Nov. 29, 2022

(54) ROBOTIC POWERED CARGO HANDLING SYSTEM

(71) Applicant: Urbineer Inc, Los Angeles, CA (US)

(72) Inventors: Stuart Marshall, Los Angeles, CA (US); Arakel Melidonian, Los Angeles, CA (US); John Cowan, Los Angeles, CA (US)

(73) Assignee: Urbineer Inc, Los Angeles, CA (US)

( * ) Notice: Subject to any disclaimer, the term of this patent is extended or adjusted under 35 U.S.C. 154(b) by 0 days.

(21) Appl. No.: 17/463,755

(22) Filed: Sep. 1, 2021

(65) Prior Publication Data

US 2022/0063969 A1 Mar. 3, 2022

Related U.S. Application Data

(60) Provisional application No. 63/073,006, filed on Sep. 1, 2020.

(51) Int. Cl.
*B66F 9/06* (2006.01)
*B66F 9/065* (2006.01)
(Continued)

(52) U.S. Cl.
CPC .............. *B66F 9/063* (2013.01); *B64F 1/322* (2020.01); *B66F 9/065* (2013.01); *B66F 9/0755* (2013.01); *B66F 9/122* (2013.01)

(58) Field of Classification Search
CPC .......... B66F 9/063; B66F 9/065; B66F 9/061; B66F 9/12; B66F 9/07568; B66F 7/0625; B64F 1/326; B64F 1/322
See application file for complete search history.

(56) References Cited

U.S. PATENT DOCUMENTS 3,735,885 A * 5/1973 Comfort ................. B64F 1/322
                                                            414/503
6,071,063 A * 6/2000 McGrath .................. B62D 9/00
                                                            414/529
(Continued)

FOREIGN PATENT DOCUMENTS

CN        113072010 A   *  7/2021
EP       E P-2390185 A2  * 11/2011  .............. B64F 1/322
WO         2020141397 A2    7/2020

OTHER PUBLICATIONS

Notification of Transmittal of the International Search Report and the Written Opinion of the International Searching Authority dated Dec. 1, 2021, in connection with corresponding international Application No. PCT/US2021/48626 (25pp.).

*Primary Examiner* — Kaitlin S Joerger
(74) *Attorney, Agent, or Firm* — Maier & Maier, PLLC

(57) ABSTRACT

An exemplary embodiment may provide a robotic powered cargo handling system. An embodiment may implement a pallet-lift mechanism to lift cargo or pallets. Powered rollers may be embedded into the forks of a pallet-lift mechanism and on top of the vehicle body. An exemplary embodiment may be fully autonomous. A user or software may direct the vehicle to a pallet or piece of cargo and set a destination for the cargo. Sensors, cameras, GPS, and computer vision may be implemented to navigate and avoid obstacles. An exemplary embodiment may include independent 4-wheel steering, 4 corner height adjustment, in-hub electric motors, and pneumatic or solid tires.

30 Claims, 14 Drawing Sheets

(51) Int. Cl.
  *B66F 9/075* (2006.01)
  *B64F 1/32* (2006.01)
  *B66F 9/12* (2006.01)

(56) References Cited

U.S. PATENT DOCUMENTS

| | | |
|---|---|---|
| 2005/0023052 A1 | 2/2005 | Beck et al. |
| 2005/0034908 A1 | 2/2005 | Raetze et al. |
| 2016/0332554 A1* | 11/2016 | Ambrosio ............... B62D 33/02 |
| 2019/0308856 A1* | 10/2019 | Wright ................. B65G 1/0492 |
| 2019/0308860 A1* | 10/2019 | Schuetzeneder .......... B66F 9/10 |
| 2019/0352158 A1* | 11/2019 | Tani ........................ B66F 9/063 |
| 2020/0041994 A1 | 2/2020 | Alalao et al. |
| 2021/0001920 A1* | 1/2021 | Mcvicar ................... B62D 5/26 |
| 2021/0339994 A1* | 11/2021 | Schottke ............. B66F 9/07586 |

* cited by examiner

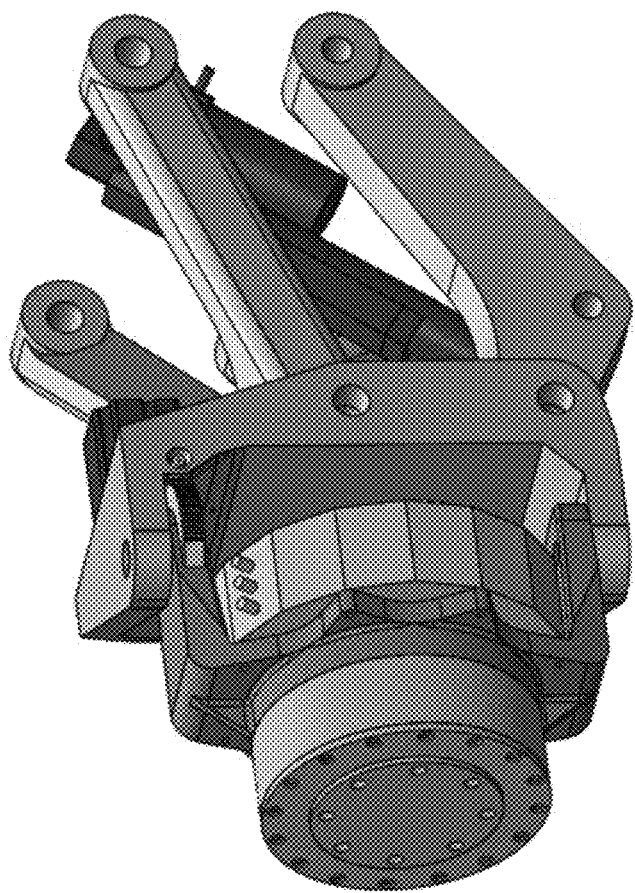
Fig. 6

ROBOTIC POWERED CARGO HANDLING SYSTEM

The present patent application claims benefit and priority to U.S. Provisional Patent Application No. 63/073,006 filed on Sep. 1, 2020 which is hereby incorporated by reference into the present disclosure.

FIELD

An exemplary embodiment relates to the field of cargo handling systems.

BACKGROUND

Variations of forklifts exist with different weights, sizes, features, and lifting capabilities. For example, a K Loader can lift up to 20 tons and is equipped with four-wheel steering and platform angle adjustment up to 4 degrees in two axes. K Loaders are often used on runways to load airplanes but cannot operate on uneven ground. The Hyster H170 forklift can lift up to 10,000 pounds. It is typically used for lifting and moving pallets and is only capable of two-wheel steering. Further, the forks are adjusted manually, and the platform angle may also be adjusted. The JCB 525 Telehandler and the JLG Atlas 2 both implement four-wheel steering, independent height adjustment, tilt adjustment, and manual fork adjustment.

The CAT 10K ATFL uses four-wheel articulation, as well as platform tilt adjustment. Further, the ATFL can be configured to fit inside a C-130; it offsets three 463 L pallet's worth of volume. However, for the CAT 10K ATFL to fit inside the C-130, the driver's canopy must be manually removed, and the lifting fork must be manually adjusted. Once inside the aircraft, it must be placed in the forward section due to its 25,000-pound weight.

The Indian Institute of Technology Madras created a cargo ground build-up system which can unload pallets from a C-130. Further, this cargo system is designed to fit in the 6th pallet slot of a C-130. It does not have a steering mechanism or a lifting mechanism.

U.S. Pat. No. 9,944,213 B2 describes a robotic cargo system that can move cargo without requiring use of additional material handling equipment (such forklifts and K-Loaders). The Stratom patent uses a cargo loading system, ramp ascent and descent algorithms, and autonomous navigation. Cargo is drawn up onto the carrying platform using a winch system. Thus, special accommodations are required to interface with the winch, and the cargo must be able to be dragged over the surface below. Further, the Stratom device offers no height adjustability for off-loading once the cargo is on the vehicle and cannot position off-loaded pallets with precision. These limitations make widespread implementation of this solution difficult.

SUMMARY

According to at least one exemplary embodiment, a method, system and apparatus for an autonomous cargo vehicle may be shown and described.

Conventional forklifts operate in complex environments with large degrees of freedom, often requiring continuous readjustment of cargo with multiple spotters to achieve safe loading and transportation of palletized cargo. Developing an autonomous forklift utilizing conventional forklift architecture would introduce many challenges to the controls system and subsequently lead to an overly complex and burdensome system. To solve the task from a holistic autonomous perspective, a unique vehicle layout may be implemented that considers the complexities of each step and creates a cohesive architecture that is tailored to the strengths and weaknesses of modern sensing and control systems.

An exemplary embodiment utilizes a set of innovative lifting forks along with a stable transportation platform. Powered rollers integrated into the forks and platform may support autonomous repositioning and maneuvering of the cargo. To avoid strenuous lifting of cargo and potential tip over concerns, an exemplary vehicle architecture may utilize an innovative height adjusting platform that lowers to the ground level. In this exemplary configuration, the vehicle may utilize a pallet jack mechanism to lift the cargo in lieu of a forklifting mechanism. The pallet jack mechanism yields an inherently stable mechanical configuration that may reduce both the lifting force and risk of tip over.

Once the cargo is secured on the transportation platform, the vehicle may raise the platform height to driving level. The same mechanism used to lower the platform may also be used to raise the platform height to accommodate cargo handoff from/to various ground/air vehicles or cargo docks. An exemplary suspension system may also support independent four-corner height and angle adjustment which may account for an incline or gradient misalignment during the loading/unloading process.

Typical forklifts and cargo transportation vehicles utilize bespoke systems for height and angle adjustment, which would add an unnecessary burden to an autonomous system. By consolidating features into dual-purpose mechanisms, an exemplary embodiment may further reduce the number of sensors, actuators, and degrees of freedom and effectively simplifies the autonomous control.

The adjustable platform with integrated powered rollers yields significant flexibility and allows the vehicle to safety handoff cargo to existing manned or future unmanned air or ground vehicles. Therefore, achieving a critical leg in the autonomous cargo transportation system.

To further improve the maneuverability of the autonomous system, an exemplary embodiment implements independent four-wheel steering with an enhanced steering angle. This may allow the vehicle to drive for/aft, laterally, or diagonally without the use of complex omnidirectional wheels or unstable skid steer systems. This may provide an advantage compared to conventional forklift and ground transportation vehicles that struggle maneuvering around dense areas.

Additionally, an exemplary embodiment may achieve a significantly lighter final design compared to conventional forklifts with similar max load ratings, allowing an embodiment to traverse inside an aircraft or any other pressure sensitive terrain without any manual reconfiguration.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 6 is an exemplary embodiment of an exemplary wheel hub.

DETAILED DESCRIPTION

Figure 1:
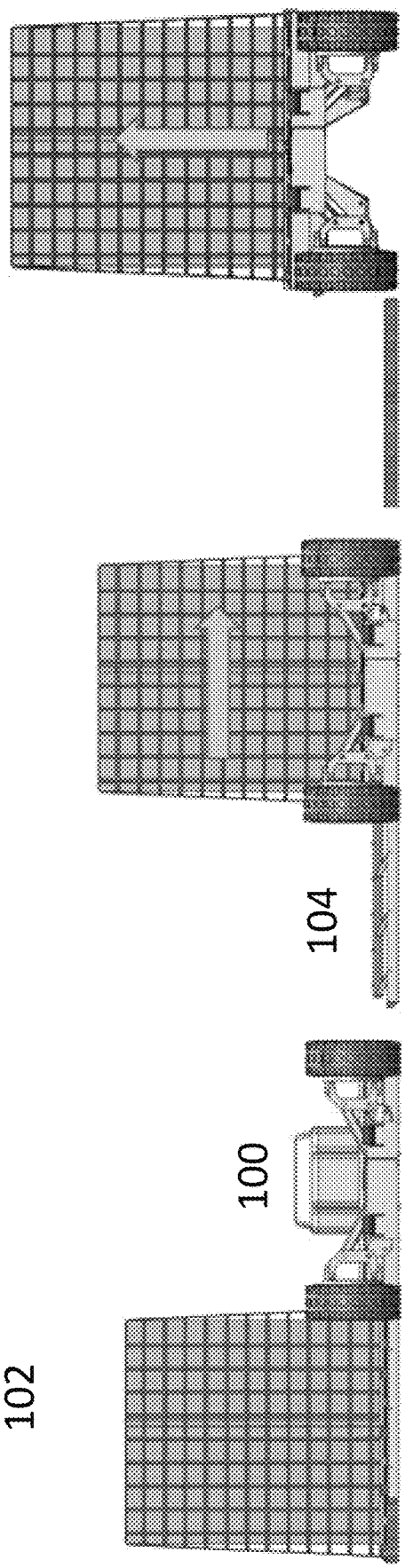
FIG. 1 is an exemplary embodiment of a pallet jack mechanism lifting a pallet onto a vehicle.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

An exemplary embodiment may implement autonomous control and management of the cargo by tailoring the lifting and loading maneuvers to best accommodate autonomous control logic with a reduced number of sensors. An embodiment may use an integrated set of sensors with algorithms that may independently recognize cargo agnostic pallets, personnel, vehicles, aircrafts, and any other contemplated object, obstacle, or person. Autonomous navigation may be implemented with route optimization between waypoints. Obstacle avoidance combined with GPS data and simultaneous localization and mapping techniques based on a fusion of data from multiple sensors may also be implemented. The computer vision capabilities in an exemplary embodiment may enable accurate alignment with both the palletized cargo, required for positioning of the forks, and with any cargo loading vehicle, cargo aircraft, or cargo dock where the pallet is being delivered. This level of autonomy may minimize any additional logistics support and burden on personnel. Sensors may include, for example, cameras, ultrasonic sensors, LIDAR, RADAR, and GPS.

An exemplary embodiment may use a combination of powered rollers embedded into the forks and the cargo platform of the vehicle. The powered rollers may be used to load, unload, and position the cargo onto the vehicle in an autonomous system. The same powered rollers can also be used to transfer the cargo onto a similar cargo loading vehicle, cargo aircraft, or cargo dock. The powered rollers may utilize a motor to simultaneously power a set of rollers using direct drive, chain drive, belt drive, or gear drive system.

The cargo platform of the vehicle may utilize a series of rollers to achieve a combination of lateral, diagonal, rotational, or transverse movement of the cargo. The rollers in the platform may be omnidirectional rollers to accommodate multidirectional control. The modular locking features on the platform may securely restrain a wide variety of cargo sizes, including but not limited to the 463 L military pallet, for example.

The chassis and suspension design of an exemplary embodiment may provide height adjustment, such that the cargo platform can be lowered to ground level. This unique attribute yields the ability to use a pallet jack mechanism instead of a forklifting mechanism. The use of a pallet-jack mechanism instead of a forklifting mechanism has several benefits. For example, the stability of the vehicle and cargo during the strenuous process of loading/unloading heavy and/or large cargo may be improved. The pallet-jack mechanism also eliminates the concern of vehicle or cargo tip over during loading and unloading operation. The weight of the vehicle may be reduced, and a counterbalance may not be required. Further, the accuracy needed to position the forks relative to the cargo may be reduced. The actuator force requirement may also be significantly reduced since an exemplary pallet-jack mechanism may also reduce the lifting height.

An exemplary embodiment may implement independent four-corner height adjustment. This may allow the platform to accommodate slopes or grades in the ground relative to the floor or docking location. Further, the platform may be raised or lowered in height to accommodate cargo transfer between multiple types of ground/air vehicles. An exemplary system may also use the four-corner height adjustment to augment the center of gravity of the vehicle or ride height of the vehicle to best accommodate the terrain and/or operation. The load may be evenly distributed into the four corners of the vehicle, thus reducing lifting burden.

An exemplary embodiment may achieve a lightweight vehicle layout. The pallet-jack mechanism and the dual-purpose lifting/suspension system both provide significant weight savings over prior art embodiments. These weight reductions may allow an exemplary embodiment to traverse the inside of an aircraft, such as a C-130 or C17, for example, without the need for protective ground shoring or manual vehicle reconfiguration. Thus, large cargo aircrafts may be fully autonomously loaded and unloaded. Compared to forklifts with similar lift ratings, an exemplary embodiment may significantly reduce the burden of the lifting mechanism and can yield a lightweight solution with enhanced capabilities. The actuator may be an electromechanical system that uses internal worm gears to prevent back drive.

An exemplary embodiment may implement independent four-wheel steering to allow for enhanced maneuverability in narrow spaces. For example, four-wheel steering may allow an exemplary embodiment to navigate densely populated areas or maneuver through aircrafts. An exemplary steering system may provide over 90-degree range of steering per wheel by a motorized gear drive system. A drive motor may assist the steering motor during steering operation. This may avoid tire scrubbing during static steering and can reduce the load requirement on the steering motor. A worm gear may be implemented to prevent back-drive so that the drive motors do not inadvertently affect the steering angle.

The drive system may incorporate in-hub electric motors to avoid the need for complex driveshafts and axles, thus improving the vehicle's ground clearance and ability to lower the chassis to ground level. This exemplary configuration may favor torque and control over top speed. The use of electric in-hub motors may also support an increased steering angle input per corner. An exemplary embodiment may be capable of steering at an angle of 120 degrees per corner. This may allow an exemplary embodiment to drive forward or laterally without the use of skid steering systems or special omnidirectional wheels.

An exemplary embodiment may be powered by battery, or alternatively a generator running off an internal combustion engine. The use of a standard fuel type increases the practicality of the system and the ease of integration in any military or commercial logistical environment.

An exemplary embodiment may place a low-pressure footprint onto the floor/ramp of an aircraft (allowing an exemplary vehicle to navigate the aircraft without applying too much pressure to the floors or ramps), support the axle weight with a fully loaded pallet, and accommodate the geometric constraints of a lifting mechanism. The system may utilize pneumatic tires to eliminate shoring requirements and minimize floor loading by using automatically deflating tires using a built-in air compressor.

Human tasks might not translate well into an autonomous system since humans have countless feedback "sensors" with instantaneous processing speed and intuition. Developing an autonomous forklift to operate in the same manner as a manned forklift may require an array of mechanical and vision sensors to monitor stability and ensure the lifting operation is safe. This provides challenges from both a cost and data processing standpoint. Furthermore, the manned operations may rely on human spotters to aid in blind spots, which may increase cost and complexity to a robotic system.

To solve the task from a holistic autonomous perspective, a unique vehicle layout may be developed that considers the complexities of each step and creates a cohesive architecture that is tailored to the strengths and weaknesses of modern sensing and control systems. Powered rollers embedded into forks may safely translate the cargo onto a stable platform. This may be achieved through an innovative height adjusting platform along with smart lifting forks with embedded powered rollers. The vehicle platform may lower to the ground level, the cargo may be slightly lifted to allow transportation of the cargo via powered rollers. Strenuous lifting of heavy cargo may be performed in inherently stable mechanical configuration, thus reducing risk and subsequently cost and complexity. An exemplary approach to lifting/loading heavy cargo may reduce the weight and force requirements of the vehicle, allowing the vehicle to weigh less than the max lift rating. In contrast, typical forklifts weigh 2.5× their max load rating, thus limiting their versatility in weight sensitive terrain. Typical forklifts are also very sensitive to the center of gravity (CG) of the cargo being lifted, which must be factored into the tip over calculation for conventional forklifts. An exemplary embodiment further provides benefits by increasing the vehicle's stability while traversing terrain. This may be accomplished by positioning the heavy cargo over the CG of the vehicle, as opposed to a conventional forklift that suspends the cargo cantilevered in front. An exemplary lifting platform can also adjust the height, and thus effectively the CG and ground clearance of the vehicle to further reduce the likelihood of tip over.

An exemplary embodiment may implement a suspension system which yields independent height adjustment at all four corners, which in turn yields multiple axis slope adjustment. Thus, an exemplary embodiment may account for any incline and grade corrections with the ground or matting docking location. Vehicles may integrate a bespoke mechanism purely for slope correction, which for an autonomous system adds further complexity and unnecessary actuators and degrees of freedom.

An exemplary system may also be utilized to lift the cargo platform to align with the docking height of mating air/ground vehicles for safe cargo handoff. In contrast, existing operations may utilize a combination of vehicles tailored for each leg of the mission profile, an exemplary embodiment may safely perform all aspects of the lifting and loading operation without any loss of fidelity or functional compromises. The consolidation of multiple vehicles into one system further increases safety by reducing unnecessary handoffs.

Typical forklifts and large cargo transport vehicles struggle to maneuver tight corners, densely populated areas, or near large aircrafts. The innovative suspension layout in an exemplary embodiment utilizes a combination of in-hub electric drive motors with a steering system to achieve independent four-wheel steering. The use of electric in-hub drive motors may eliminate the mechanical driveshaft, which in turn yields design flexibility. This may increase the maximum steering angle. A wide steering angle allows a vehicle to traverse both fore/aft, laterally, and diagonally without the need of complex omnidirectional wheels or unstable skid steer systems. An exemplary embodiment may also allow the vehicle to augment the turning radius to best accommodate the environment.

Typical large forklifts may far exceed the weight and size limitations of cargo aircrafts, thus requiring manual reconfiguration along with protective ground shoring to safely transport the forklift inside the aircraft. An exemplary embodiment's combination of the dual-purpose mechanisms and innovative architecture allows for a very light weight and compact form factor. Thus, allowing an exemplary vehicle that may traverse inside large cargo aircrafts without the need for manual reconfiguration or any tertiary procedures.

In another exemplary embodiment, the lifting forks with powered rollers may be also utilized in a conventional forklift configuration to lift cargo and autonomously transport the cargo onto a stable platform. The utilization of the platform may increase the safety of the vehicle while traversing terrain with heavy or large cargo. Powered rollers embedded in both the rollers and platform may allow seamless and fully autonomous repositioning of cargo between forks and platforms.

Referring now to FIG. 1, FIG. 1 shows an exemplary operation of an exemplary embodiment. An exemplary vehicle 100 may position itself next to the pallet 102. It may then extend the pallet jack mechanism 104 underneath the pallet 102. Next, the pallet jack mechanism may lift the pallet 102 and use rollers to transfer the pallet 102 onto the vehicle 100. Once the pallet 102 is secured, the vehicle 100 may raise the platform to driving height. Finally, the pallet jack mechanism may then be retracted into the vehicle.

Figure 2:
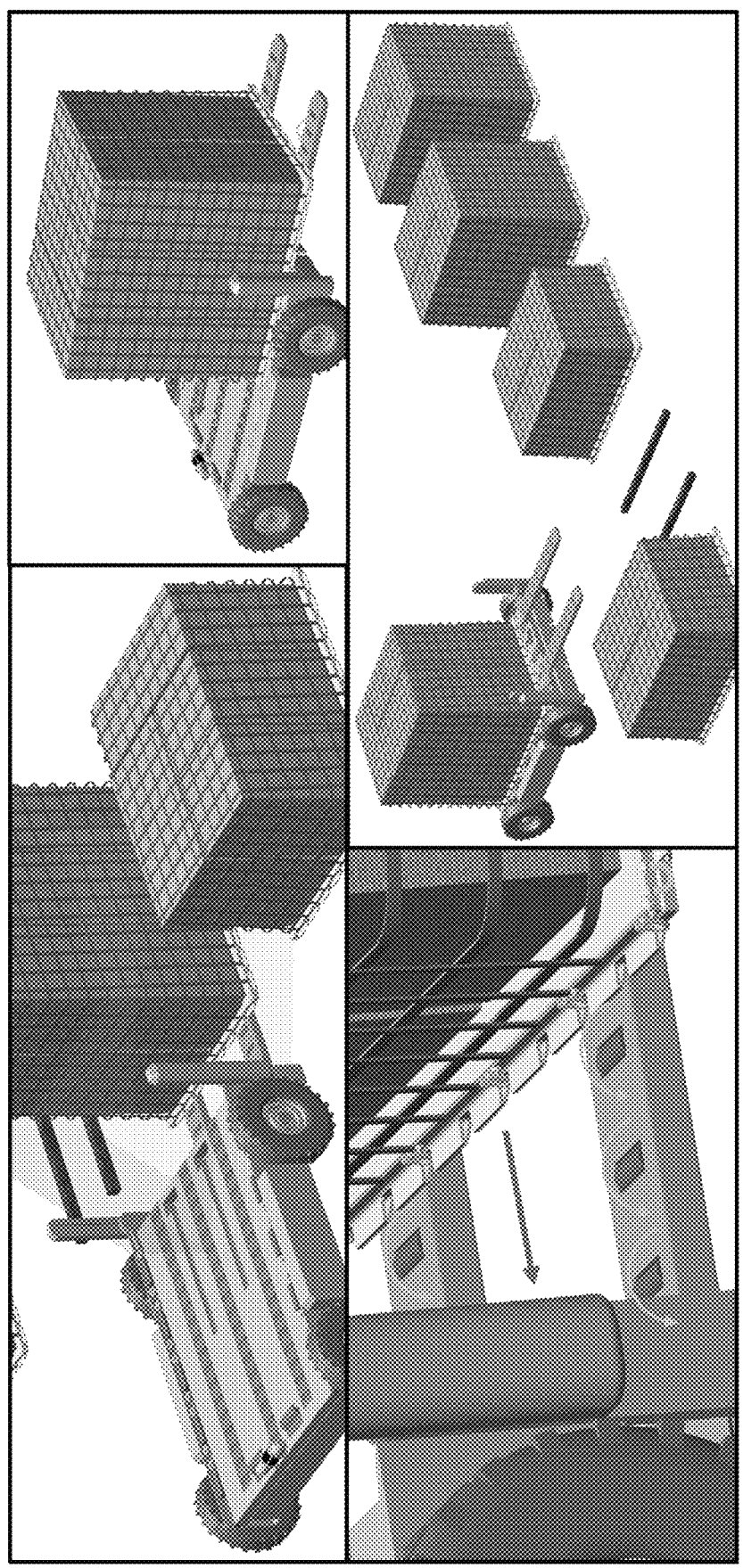
FIG. 2 is an exemplary embodiment of a pallet jack mechanism lifting a pallet onto a vehicle.

Referring now to FIG. 2, FIG. 2 may show another exemplary implementation of an exemplary embodiment. The vehicle 100 may approach the target pallet 102, extend the pallet jack mechanism 104, and lift the pallet 102 onto the vehicle 104 using the roller mechanism.

Figure 3:
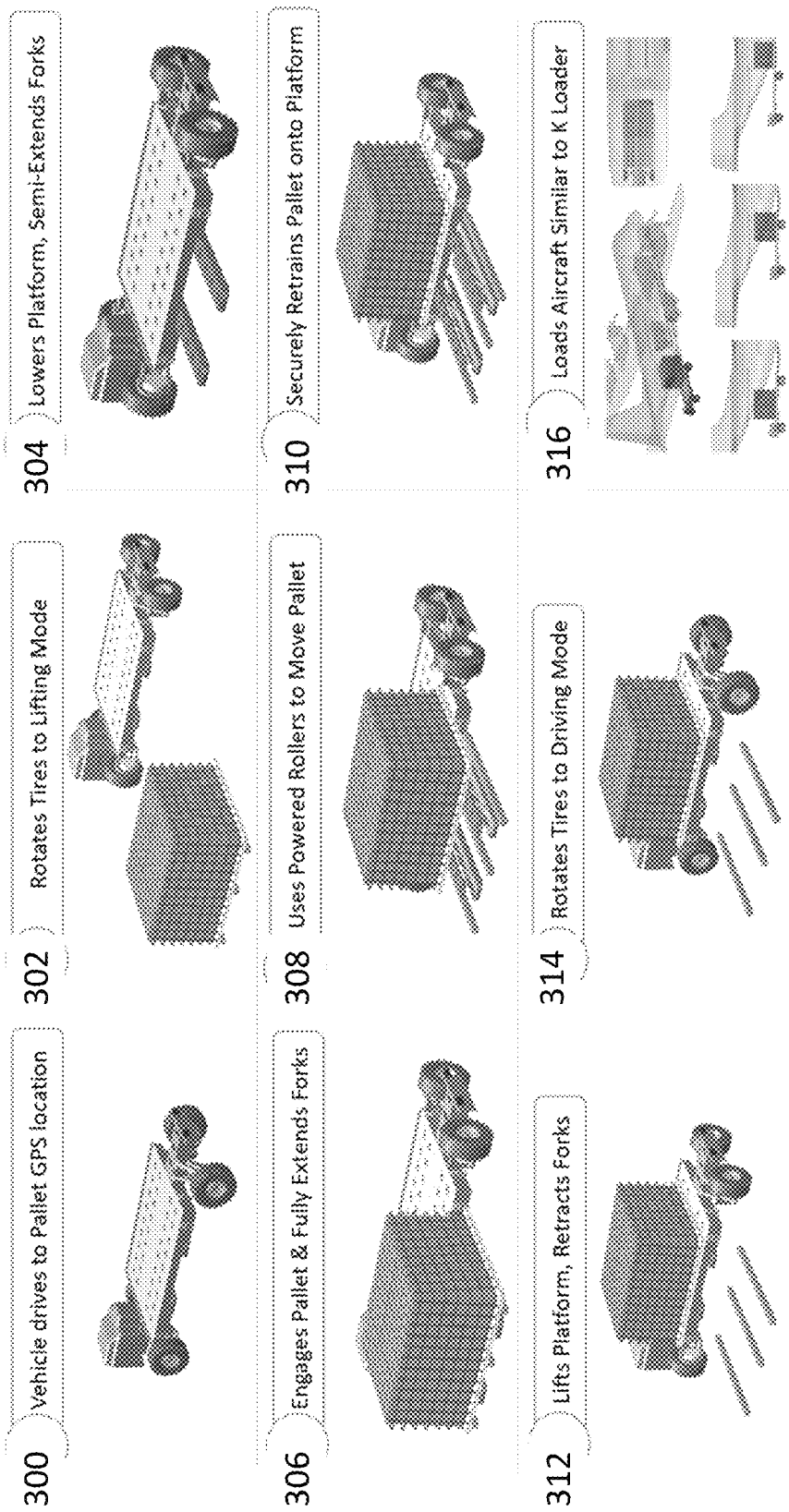
FIG. 3 is an exemplary schematic flowchart illustrating a method for loading cargo using an exemplary embodiment.

Referring now to FIG. 3, FIG. 3 may illustrate an exemplary method for loading an aircraft. First, the vehicle may drive to the pallet 300. The pallet location may be identified via GPS location, for example, however any other suitable means may be implemented (such as computer vision). Next, the tires may rotate to face the pallet and engage the lifting mode 302.

Figure 4:
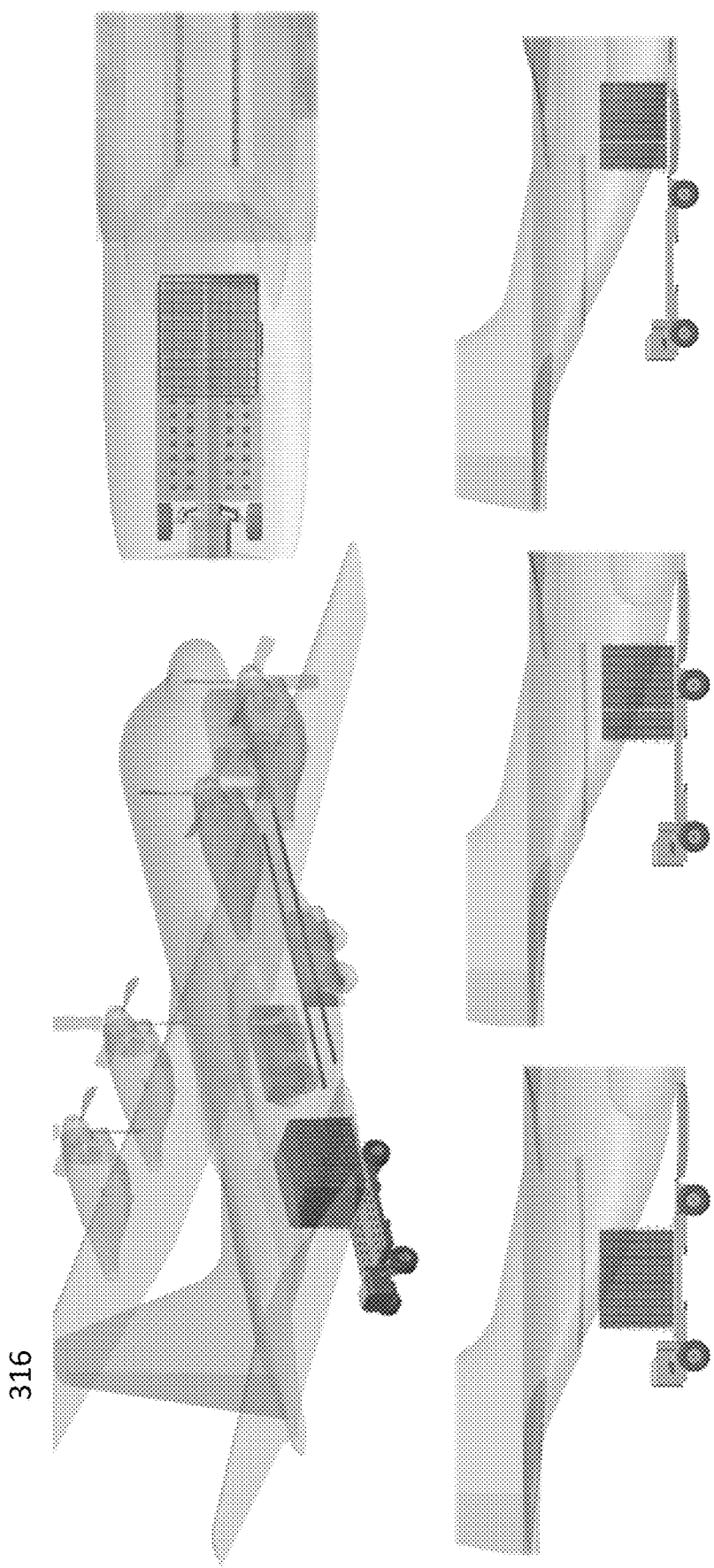
FIG. 4 is an exemplary embodiment of a vehicle loading a pallet onto an aircraft.

Next, the vehicle may lower the platform and extend the forks 304. The forks will engage the pallet and fully extend underneath 306. Powered rollers may move the pallet onto the vehicle 308, until the pallet is securely contained onto the platform 310. Once the pallet is secured, the vehicle may lift the platform and retract the forks 312. The tires may then rotate forward in order to drive 314. Finally, the pallet may be loaded onto the destination 316. In this exemplary embodiment, the destination is an aircraft. Referring now to FIG. 4, FIG. 4 may illustrate an exemplary aircraft loading process 316. In an exemplary embodiment, a pallet may be brought to the cargo bay of the aircraft and the vehicle's rollers may activate to roll the pallet into the rear of the aircraft.

Figure 5:
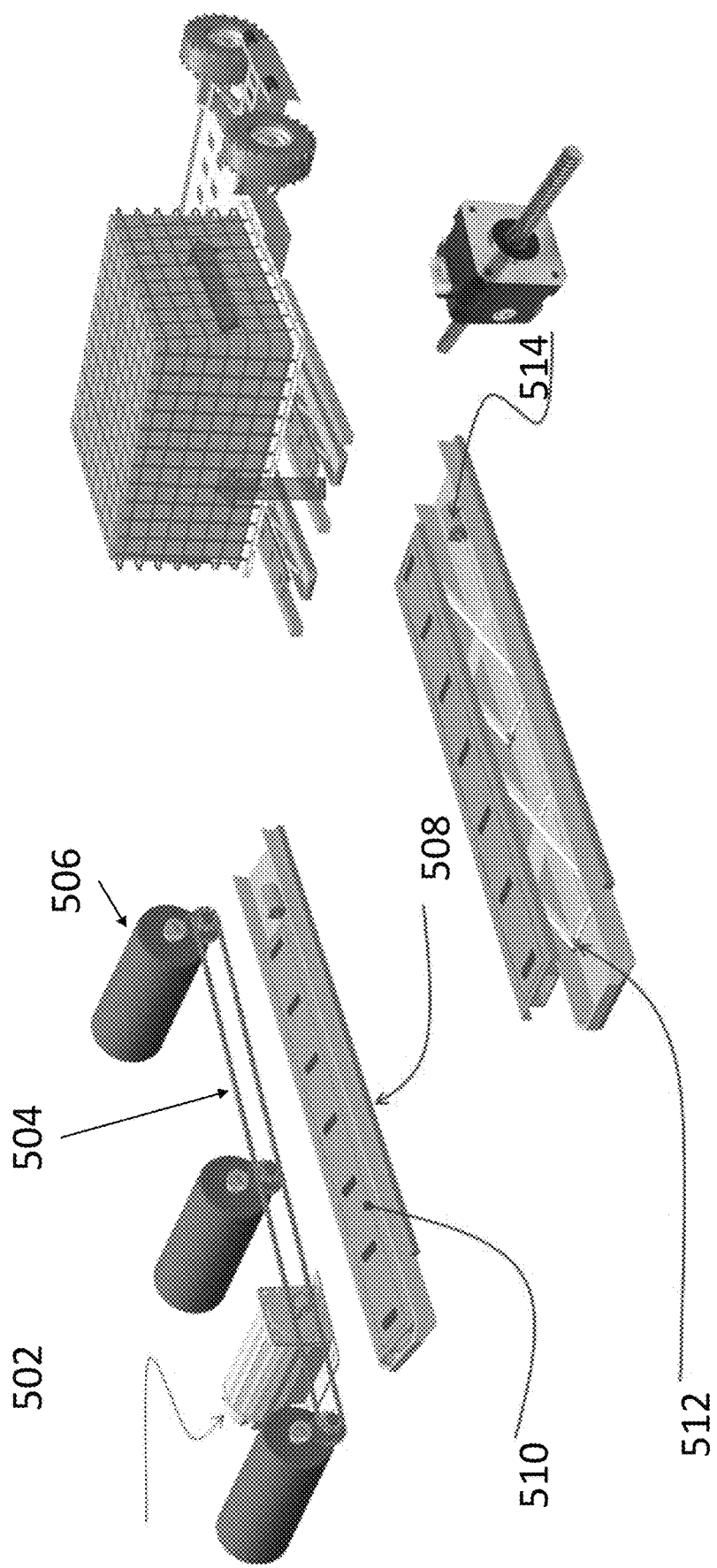
FIG. 5 is an exemplary embodiment illustrating an exemplary roller mechanism.

Referring now to FIG. 5, FIG. 5 may illustrate an exemplary roller mechanism. The roller may include a DC motor 502 using a chain drive system 504 connected to each roller 506. A rack and pinion 508 may be used to extend and retract forks. An access panel 510 may be used for routine inspection and maintenance. A scissor lift mechanism 512 may lift the pallet, similar to a scissor lift used in a pallet jack. A screw stepper motor may be used to actuate the scissor lift mechanism 514.

Referring now to FIG. 6, FIG. 6 may illustrate an exemplary suspension and wheel hub. The system may incorporate a steering system with an electric stepper motor and gear set. A lifting system with an electric actuator may also be included in order to lift each of the 4 corners of an exemplary embodiment. Further, a drive system with an electric motor inside the hub and a reductive gear set may be implemented on each corner.

Figure 7:
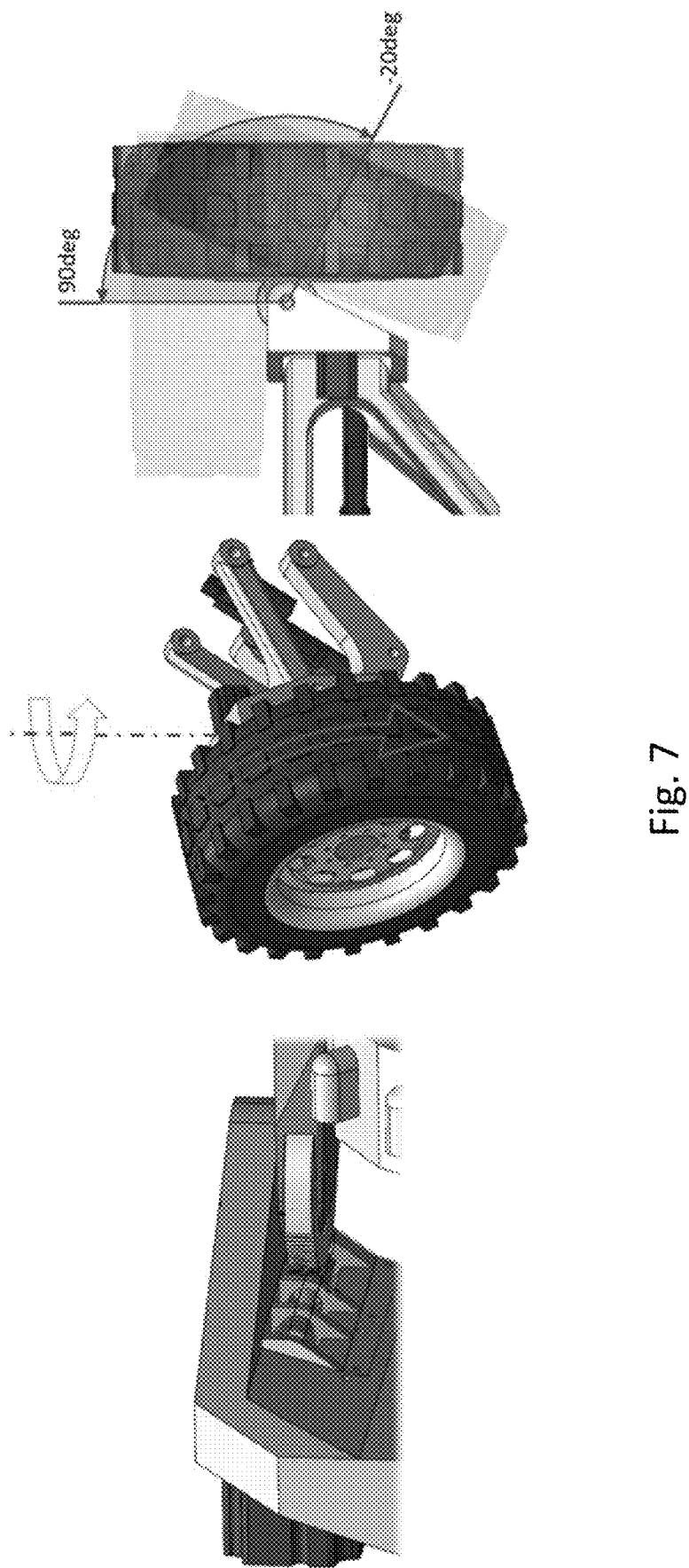
FIG. 7 is an exemplary embodiment of an exemplary suspension.

Referring now to FIG. 7, FIG. 7 may illustrate an exemplary drive system. A high torque motor may be implemented at each wheel in order to turn the wheels. A rack gear along with a worm gear may mechanically prevent back drive. As shown in FIG. 7, the drive and steering motors may work together to steer the vehicle. Finally, FIG. 7 illustrates an angle of rotation which may be implemented at each wheel of an exemplary embodiment.

Figure 8:
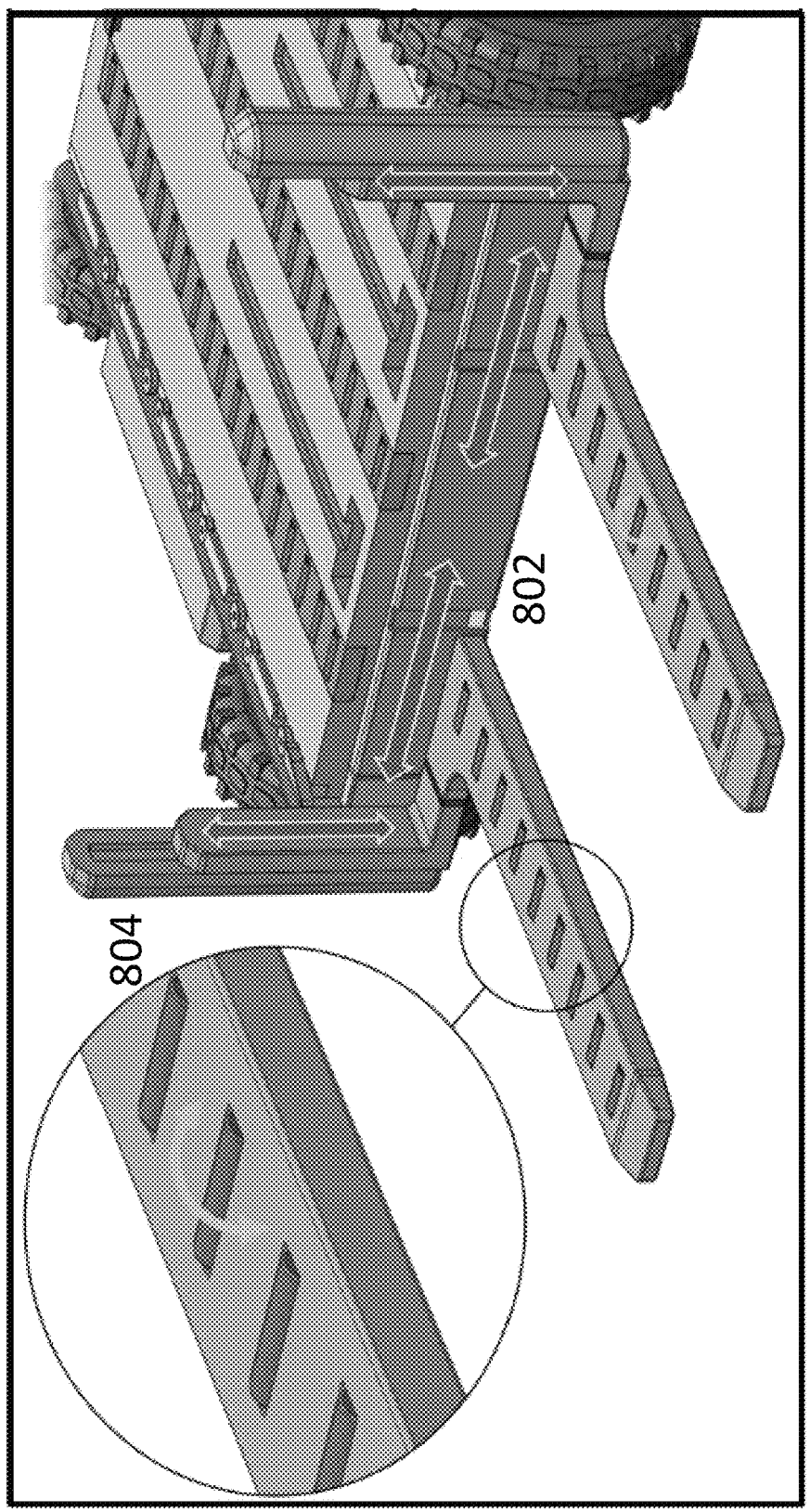
FIG. 8 is an exemplary embodiment of a forklift fork and roller mechanism.

Referring now to FIG. 8, FIG. 8 may show the axes along which the forks may move along. The forks may move in a horizontal direction 802, or a vertical direction 804. Additionally, the rollers on the forks may rotate to move pallets or loaded objects closer to or further from the vehicle.

Figure 9:
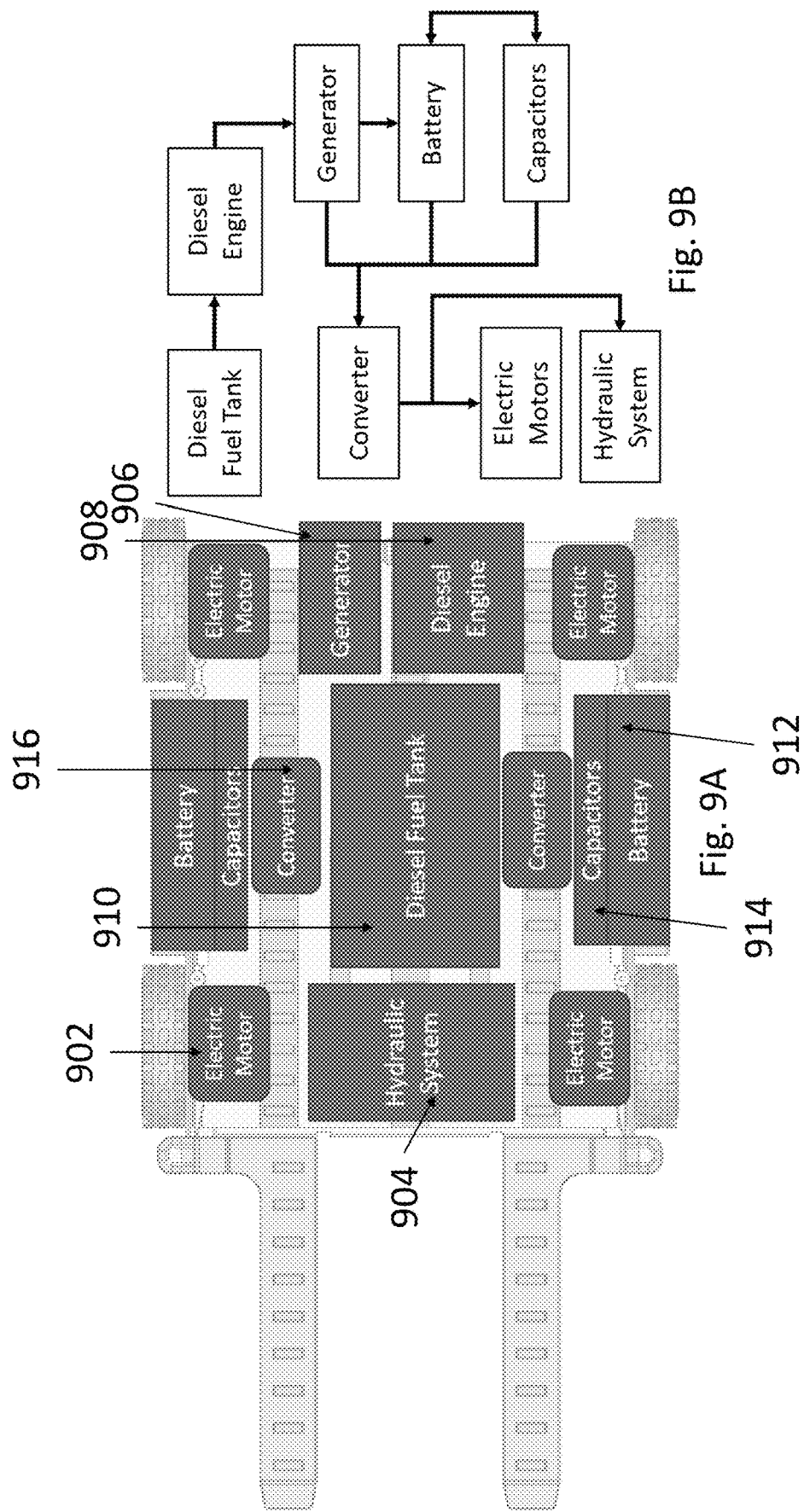
FIG. 9A is an exemplary embodiment of the internal layout of an exemplary vehicle.
FIG. 9B is an exemplary embodiment of the internal layout of an exemplary vehicle.

Referring now to FIG. 9A, FIG. 9A may illustrate an exemplary configuration for a cargo loading vehicle. The vehicle may include 4 electric motors 902 at each wheel. A front portion of the vehicle may contain the hydraulic system 904. A rear portion may include a generator 906 and a diesel engine 908. The center of the vehicle may hold the fuel tank 910. The fuel may be diesel. An exemplary embodiment may also include various batteries 912, capacitors 914, and converters 916.

Referring now to FIG. 9B, FIG. 9B may illustrate a schematic flowchart illustrating the connections between the components in exemplary FIG. 9A. The fuel tank 910 may feed fuel to the engine 908. The engine may then power the generator. The generator 906 charges the batteries 912 (which may be supplemented by capacitors 914), and also supplies power to the converters 916. The converters 916 convert the harnessed energy so that it may be used by the electric motors 902 and the hydraulic system 904.

Figure 10:
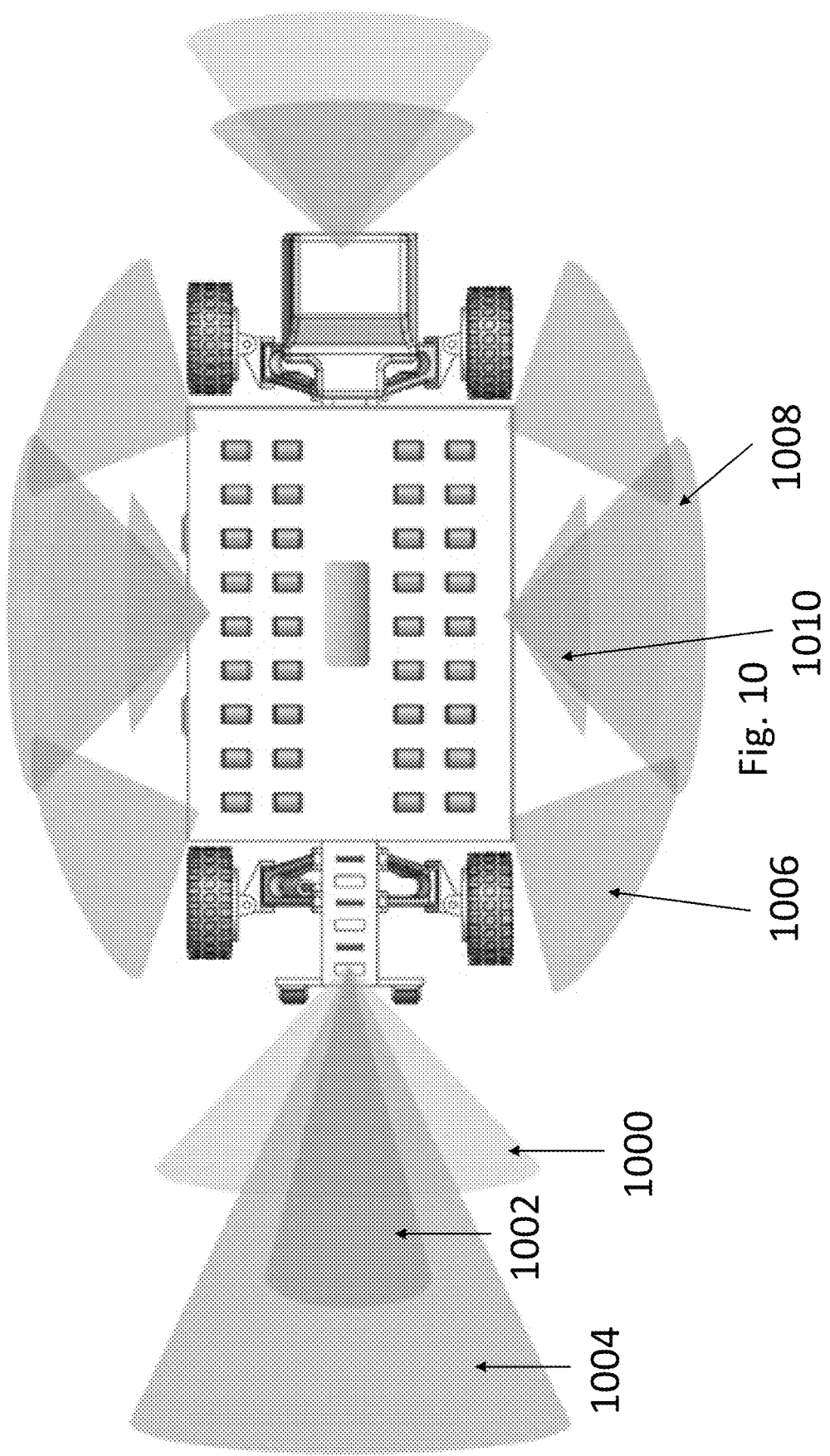
FIG. 10 is an exemplary sensor layout of an exemplary embodiment.

Referring now to FIG. 10, FIG. 10 may illustrate an exemplary sensor configuration of an exemplary embodiment. The front, rear, and sides may implement a camera 1000. The camera feed may be used for computer vision, for example. The front may implement RADAR 1002 and long-range LIDAR 1004. The sensors disposed on the front may capture farther away obstacles in order to properly prepare for them. The side portions and rear may include short range RADAR 1006. The sides may also include an infrared camera 1008 and short-range LIDAR 1010. The short-range radar on the sides may be disposed on each corner, in an exemplary embodiment. A GPS module may also be disposed anywhere on the vehicle. An exemplary embodiment may also include ultrasonic sensors.

Figure 11:
FIG. 11 is an exemplary embodiment of a control unit.

Referring now to FIG. 11, FIG. 11 may illustrate an exemplary control device for an exemplary vehicle. The control device may allow a user to select a pallet, direct a vehicle to retrieve the pallet, and then return the pallet to another location. As shown in FIG. 11, an exemplary embodiment may show the user a target location, a video feed from the vehicle. The user's current location may be shown relative to the destination and/or the pallet. Further, the control device may include controls allowing a user to manually direct the vehicle.

Figure 12:
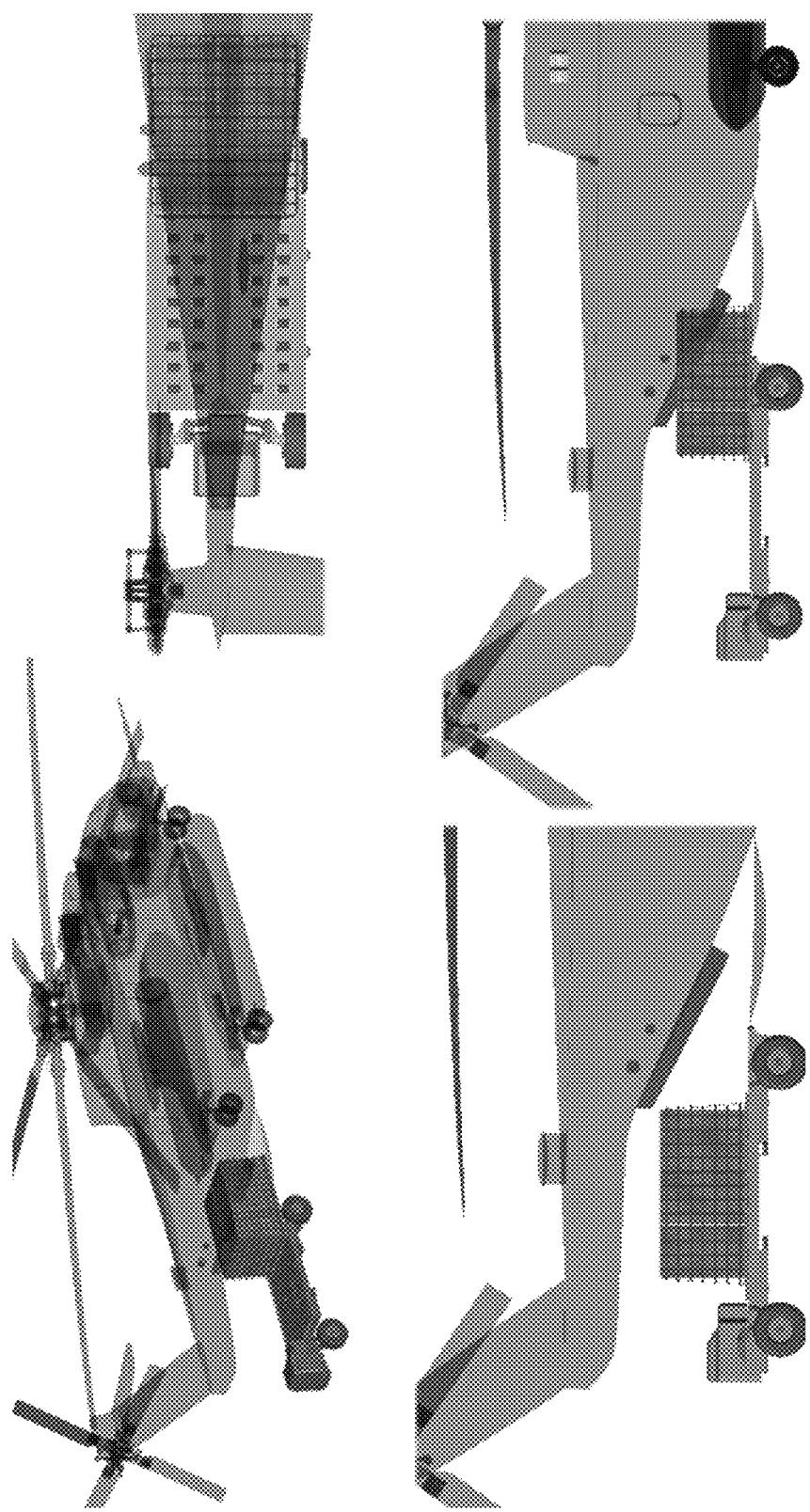
FIG. 12 is an exemplary schematic of an embodiment loading a pallet onto a helicopter.

Referring now to exemplary FIG. 12, FIG. 12 may illustrate an exemplary embodiment loading a pallet onto a helicopter. In this embodiment, the vehicle may drive up to a cargo hatch on the helicopter, where it may unload the pallet. Alternatively, it may be contemplated that the vehicle may drive into the helicopter to securely place the pallet in a secure location.

Figure 13:
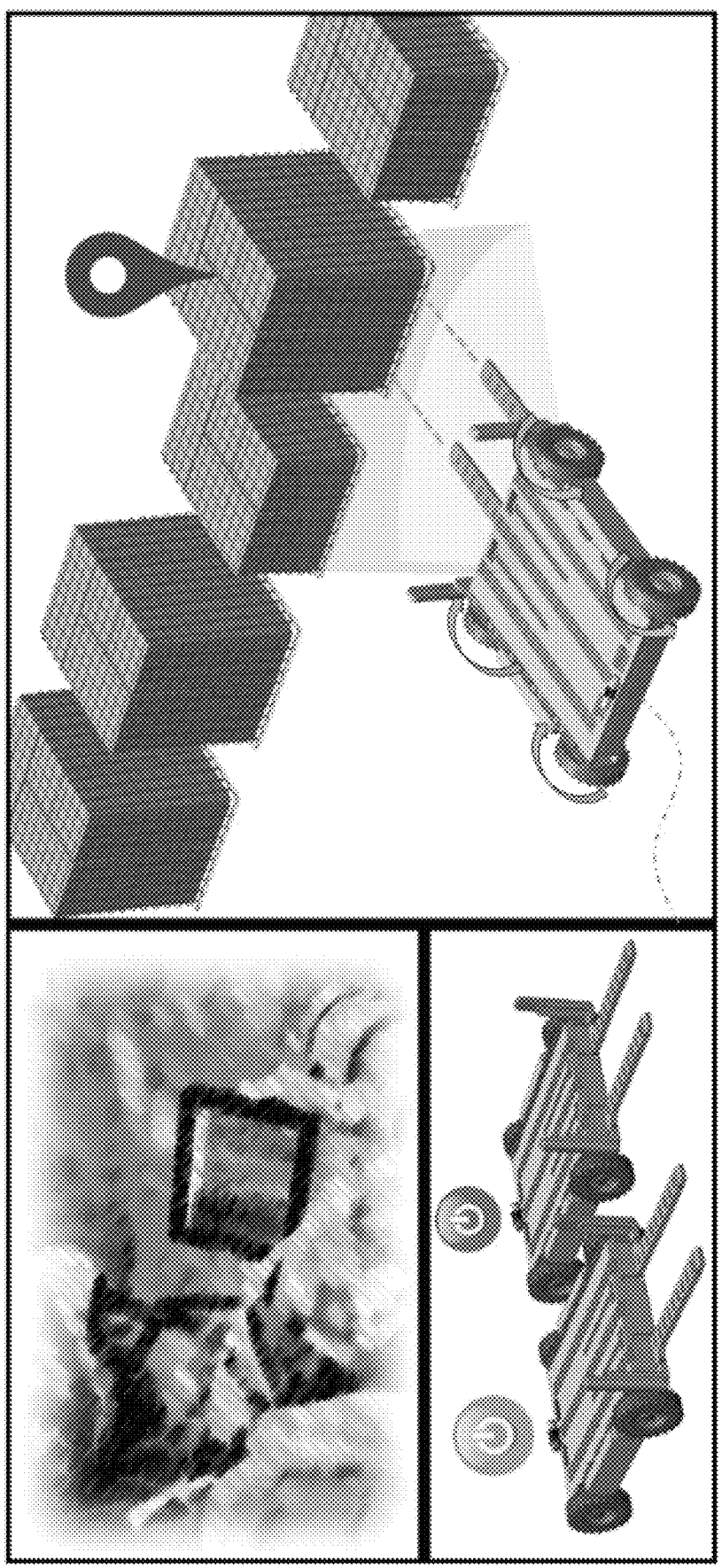
FIG. 13 is an exemplary embodiment of a vehicle navigating to a pallet.

Referring now to exemplary FIG. 13, FIG. 13 may illustrate an exemplary implementation scenario of an exemplary embodiment. As shown in FIG. 12, an operator may use a tablet or other control device to select a vehicle and then direct the vehicle to a target pallet.

Figure 14:
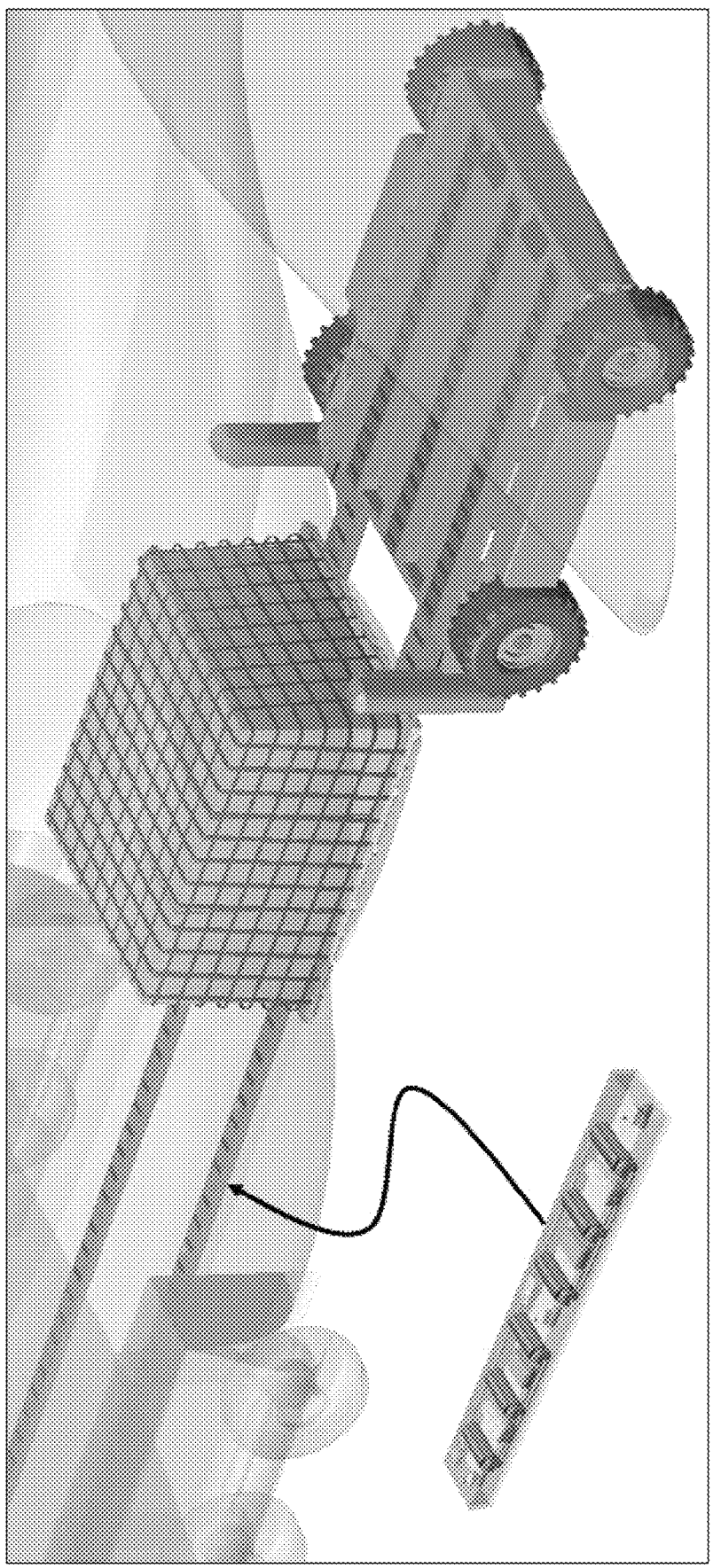
FIG. 14 is an exemplary embodiment of an exemplary roller configuration.

Referring now to exemplary FIG. 14, FIG. 14 may illustrate a vehicle loading a pallet onto a roller track. It may be contemplated that an exemplary embodiment is used along with a warehouse or aircraft which implements rollers. A pallet may be brought from the rollers on the vehicle to the rollers on the warehouse or aircraft.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An autonomous vehicle for transporting cargo, comprising:
   a vehicle body comprising a flat loading surface;
   a lift mechanism connected to the vehicle body, the lift mechanism configured to lift cargo from a side of the vehicle body onto the flat loading surface;
   a plurality of powered rollers on the vehicle body and the lift mechanism, wherein the plurality of powered rollers on the vehicle body is configured to load or unload the cargo at a target location;
   at least four wheels,
   at least four hubs comprising an electric motor configured to rotate a corresponding hub relative to the vehicle body to steer the vehicle, each hub comprising an electric motor connected to one of the at least four wheels;
   at least four electrically actuated and independently controlled body lifting mechanisms connecting the vehicle body to the at least four hubs;
   and
   a control unit configured to control the plurality of powered rollers, the lift mechanism, body lifting mechanisms, and the at least four wheels.

2. The autonomous vehicle for transporting cargo of claim 1, wherein each body lifting mechanism is configured to raise or lower independent of the other at least three independent body lifting mechanisms.

3. The autonomous vehicle for transporting cargo of claim 1, further comprising:
   a plurality of sensors connected to the control unit, wherein the control unit autonomously loads cargo based on the plurality of sensors.

4. The autonomous vehicle for transporting cargo of claim 2, wherein the control unit is configured to raise or lower each independent body lifting mechanisms based on data from a plurality of sensors.

5. The autonomous vehicle for transporting cargo of claim 3, further comprising:
   a control device operably connected to the control unit, the control device configured to receive an input from a software or a user to operate the control unit.

6. The autonomous vehicle for transporting cargo of claim 5, wherein the input comprises control instructions controlling at least one of the at least four wheels and the lift mechanism.

7. The autonomous vehicle for transporting cargo of claim 5, wherein the input comprises at least one of cargo to be moved and a transport destination.

8. The autonomous vehicle for transporting cargo of claim 3, wherein the sensors comprise at least one of a camera, a ultrasonic sensor, a LIDAR, a RADAR, and a GPS.

9. The autonomous vehicle of claim 1, wherein the at least four wheels are configured for four-wheel steering.

10. The autonomous vehicle of claim 1, wherein each of the at least four wheels comprises an in-hub electric motor and a pneumatic or solid tire.

11. The autonomous vehicle of claim 1, wherein the lift mechanism comprises two forks, each fork comprising an additional plurality of rollers, and the two forks are configured to retract in and out of the autonomous vehicle and move in a horizontal direction and a vertical direction.

12. The autonomous vehicle of claim 1, wherein the roller mechanism is configured for lateral, rotational, transverse, or diagonal movement.

13. A method for loading cargo using the autonomous vehicle of claim 1, comprising:
   navigating to a cargo location;
   rotating the at least four wheels towards the cargo in the cargo location in a position lateral to the cargo;
   actuating each of the four independent body lifting mechanisms to lower the vehicle body;
   extending the lift mechanism to engage the cargo;
   activating the plurality of powered rollers on the lift mechanism to place the cargo onto the vehicle body;
   retracting the lift mechanism;
   navigating the autonomous vehicle with the cargo to a target location;
   unloading the cargo at the target location using the lift mechanism and the plurality of powered rollers on the vehicle body.

14. The method of claim 13, further comprising, after activating the powered rollers to place the cargo onto the vehicle body:
   adjusting a height of one or more of the independent body lifting mechanisms to either balance a center of gravity of the cargo on the vehicle body or position the vehicle body to be level with the target location to unload the cargo.

15. The method of claim 13, further comprising, after activating the plurality of powered rollers to place the cargo onto the vehicle body:
   raising the vehicle body; and
   rotating the wheels to a driving configuration.

16. The method of claim 13, further comprising, after extending the lift mechanism to engage the cargo:
   raising the lift mechanism to match a height of the vehicle body.

17. The autonomous vehicle of claim 1, wherein the plurality of powered rollers on the vehicle body is configured to roll in at least two directions.

18. A method for loading cargo using a vehicle, comprising:
   navigating the vehicle to a cargo location using one or more sensors;
   rotating four wheels of the vehicle toward cargo in the cargo location in a position lateral to the cargo;
   lowering a vehicle body by actuating each of at least four independent body lifting mechanisms;
   extending a lift mechanism from the vehicle to engage the cargo;
   activating a plurality of powered rollers on the lift mechanism to place the cargo onto the vehicle body;
   retracting the lift mechanism and raising the vehicle body by actuating the at least four independent body lifting mechanisms;

navigating the autonomous vehicle with the cargo to a target location; and activating a plurality of powered rollers on the vehicle body to unload the cargo at the target location.

19. The method of claim 18, further comprising:

adjusting a height of one or more the independent body lifting mechanisms to either balance a center of gravity the cargo on the vehicle body or position the vehicle body to be level with the target location to unload the cargo.

20. The method of claim 18, further comprising:

raising the cargo using a plurality of additional rollers in the target location, and transporting the cargo to the plurality of additional rollers.

21. A method for loading cargo using a vehicle, comprising:

navigating the vehicle to a cargo location using one or more sensors;

rotating four wheels of the vehicle toward cargo in the cargo location in a position lateral or in-line to the cargo;

engaging the cargo to load the cargo onto the vehicle;

navigating the vehicle with the cargo to a target location;

activating a plurality of powered rollers on a vehicle body of the vehicle to unload the cargo at the target location.

22. The method of claim 21, wherein engaging the cargo to load the cargo onto the vehicle further comprises:

lowering a vehicle body;

positioning the vehicle body to be lower than the cargo;

navigating the vehicle to position the vehicle body under the cargo using the one or more sensors;

raising the vehicle body to place the cargo onto the vehicle body.

23. The method of claim 21, wherein engaging the cargo to load the cargo onto the vehicle further comprises:

lowering or raising the vehicle body and positioning the vehicle body to be level with the cargo;

activating the plurality of powered rollers on the vehicle body to place the cargo onto the vehicle body.

24. The method for loading cargo using the vehicle of claim 21, further comprising:

unloading the cargo at the target location using a lift mechanism with additional powered rollers.

25. The method of loading cargo using the vehicle of claim 21, wherein each of the four wheels comprises an independent body lifting mechanisms, and further comprising:

adjusting a height of one or more of the independent body lifting mechanisms to either balance a center of gravity of the cargo on the vehicle body or position the vehicle body to be level with the target location to unload the cargo.

26. The method of claim 25, where the four wheels are configured for four-wheel steering.

27. The method of claim 25, wherein each of the four wheels comprises an in-hub electric motor and a pneumatic or solid tire.

28. The method of claim 21, wherein the lift mechanism comprises two forks, each fork comprising an additional plurality of rollers, and the two forks are configured to retract in and out of the vehicle and move in a horizontal direction and a vertical direction.

29. The method of claim 21, wherein a control device is configured to receive an input from a software or a user to operate the vehicle.

30. The method of claim 21, wherein the one or more sensors comprise at least one of a camera, a ultrasonic sensor, a LIDAR, a RADAR, and a GPS.

* * * * *